United States Patent [19]
Garcia de Alba

[11] Patent Number: 6,122,904
[45] Date of Patent: *Sep. 26, 2000

[54] RAKE ATTACHMENT FOR POWER LAWNMOWER

[76] Inventor: Hector Garcia de Alba, 41 Weston Ct., S. Elgin, Ill. 60120

[ * ] Notice: This patent issued on a continued prosecution application filed under 37 CFR 1.53(d), and is subject to the twenty year patent term provisions of 35 U.S.C. 154(a)(2).

[21] Appl. No.: 09/080,611

[22] Filed: May 18, 1998

[51] Int. Cl.$^7$ .............................. A01D 7/00; A01D 42/02
[52] U.S. Cl. ...................... 56/16.9; 56/400.16; 56/400.4; 56/DIG. 9; 56/DIG. 21
[58] Field of Search .................. 56/400.01, 400.04, 56/DIG. 9, DIG. 21, 1, 2, 400.14, 400.16; 37/243; 172/643, 621

[56] References Cited

U.S. PATENT DOCUMENTS

| | | | |
|---|---|---|---|
| 2,143,402 | 1/1939 | Baker | 56/249 |
| 2,751,741 | 6/1956 | Carson | 56/400.04 |
| 3,438,183 | 4/1969 | Puretic | 56/27 |
| 3,646,736 | 3/1972 | Hutchins | 56/16.9 |
| 4,201,000 | 5/1980 | Stanford | 37/117.5 |
| 4,299,079 | 11/1981 | Lambert | 56/16.7 |
| 4,312,095 | 1/1982 | Mullins | 56/400.14 |
| 4,322,936 | 4/1982 | Whitney | 56/16.1 |
| 4,403,433 | 9/1983 | Smith | 37/243 |
| 4,541,230 | 9/1985 | Huerter | 56/193 |
| 4,578,938 | 4/1986 | Genesco | 56/295 |
| 4,987,731 | 1/1991 | Cianciulli et al. | 56/17.5 |
| 5,005,344 | 4/1991 | McCracken | 56/14.7 |
| 5,431,444 | 7/1995 | Kenealy | 56/DIG. 9 |
| 5,661,962 | 9/1997 | Monaco | 56/16.9 |
| 5,662,172 | 9/1997 | Brown | 172/22 |

FOREIGN PATENT DOCUMENTS

| | | |
|---|---|---|
| 2340131 | 2/1975 | Germany . |
| 3505407 | 2/1975 | Germany . |
| 288843 | 4/1928 | United Kingdom ................ 56/400.14 |

*Primary Examiner*—Thomas B. Will
*Assistant Examiner*—Meredith C. Petravick
*Attorney, Agent, or Firm*—Thomas R. Vigil

[57] ABSTRACT

The combination comprises a non-riding, power lawnmower having a housing mounted on fourwheels and a front mounted rake attachment for attachment to one of the opposite side walls of the housing for sweeping, scraping and thatching the area in the forward path of movement of the power lawnmower. The rake attachment comprises a generally U-shaped frame member having a bight portion and two leg portions each having a free distal end that extends rearwardly for attachment to one of the opposite side walls of the housing and first and second clamps mounted at each free distal end of each leg portion and each clamp including a U-shaped bracket which is wide enough to extend about one of the opposite side walls and which comprises a bottom plate, an elongate outer plate forming one leg of the bracket and a shorter inner plate forming the other leg of the bracket both inner and outer plates a bottom plate and extending upwardly about the housing and releasably fixed thereto with three hand manipulatable screws. The rake attachment further comprises two rake heads with each rake head comprising a cylindrical base portion and a plurality of the tines which extend from the base portion in a fanned out configuration and then extend downwardly for engaging the ground, and urging structure including a crossbar which extends across and beneath and is attached to the leg portions of the frame member and above the tines of each rake head for urging the rake heads downwardly.

1 Claim, 2 Drawing Sheets

RAKE ATTACHMENT FOR POWER LAWNMOWER

BACKGROUND OF THE INVENTION

1. Field of the Invention.

The present invention relates to a rake attachment for a power lawnmower.

2. Description of the Related Art Including Information Disclosed Under 37 CFR §§1.97–1.99.

Heretofore, various attachments for power lawnmowers have been proposed including thatching attachments, rake attachments and brush attachments.

Several examples of the previously proposed attachments are disclosed in the following U.S. Patents:

| U.S. Pat. No. | Patentee |
| --- | --- |
| 4,541,230 | Huerter |
| 4,578,938 | Genesco |
| 4,987,731 | Cianciulli et al. |
| 5,005,344 | McCracken |
| 5,661,962 | Monaco |
| 5,662,172 | Brown |

SUMMARY OF THE INVENTION

In combination, a non-riding, power lawnmower having a housing mounted on four wheels and having a U-shaped handle connected to and extending upwardly from opposite side walls of the housing and a front mounted rake attachment for attachment to one of the opposite side walls of the housing and positioned in front of a front wall of the housing of the power lawnmower for sweeping and scraping the area in the forward path of movement of the power lawnmower and for thatching or aerating the ground in the forward path of movement of the power lawnmower, the rake attachment comprising a generally U-shaped frame member having a bight portion and two leg portions each having a free distal end that extends rearwardly for attachment to one of the opposite side walls of the housing and first and second clamps mounted at each free distal end of each leg portion and each clamp including a U-shaped bracket which is wide enough to extend about one of the opposite side walls and which comprises a bottom plate forming a bight portion of the bracket, an elongate outer plate forming one leg of the bracket and a shorter inner plate forming the other leg of the bracket, having the same width as the bottom plate and extending upwardly a greater distance than the inner plate and adapted to be received within the housing of the power lawnmower and releasably fixed thereto with two hand manipulatable screws each having a wide finger engageable head extending through the free distal end of one of the leg portions, and through the outer one of the plates for releasably clamping the U-shaped attachment to one of the opposite side walls of the housing and a third screw which extends through the outer plate below the distal end of the leg portion for engaging an outer surface of the wall of the housing of the lawnmower, the rake attachment further comprising two rake heads, having tines, secured to the bight portion of the U-shaped frame member with the tines being located between the leg portions and the bight portion of the U-shaped frame member and the front wall of the housing, each rake head comprising a cylindrical base portion and a plurality of the tines which extend from the base portion in a fanned out configuration and then extend downwardly for engaging the ground, and urging structure including a cross-bar which extends across and beneath and is attached to the leg portions of the frame member and above the tines of each rake head for urging the rake heads downwardly.

DESCRIPTION OF THE PREFERRED EMBODIMENT(S)

Figure 1:
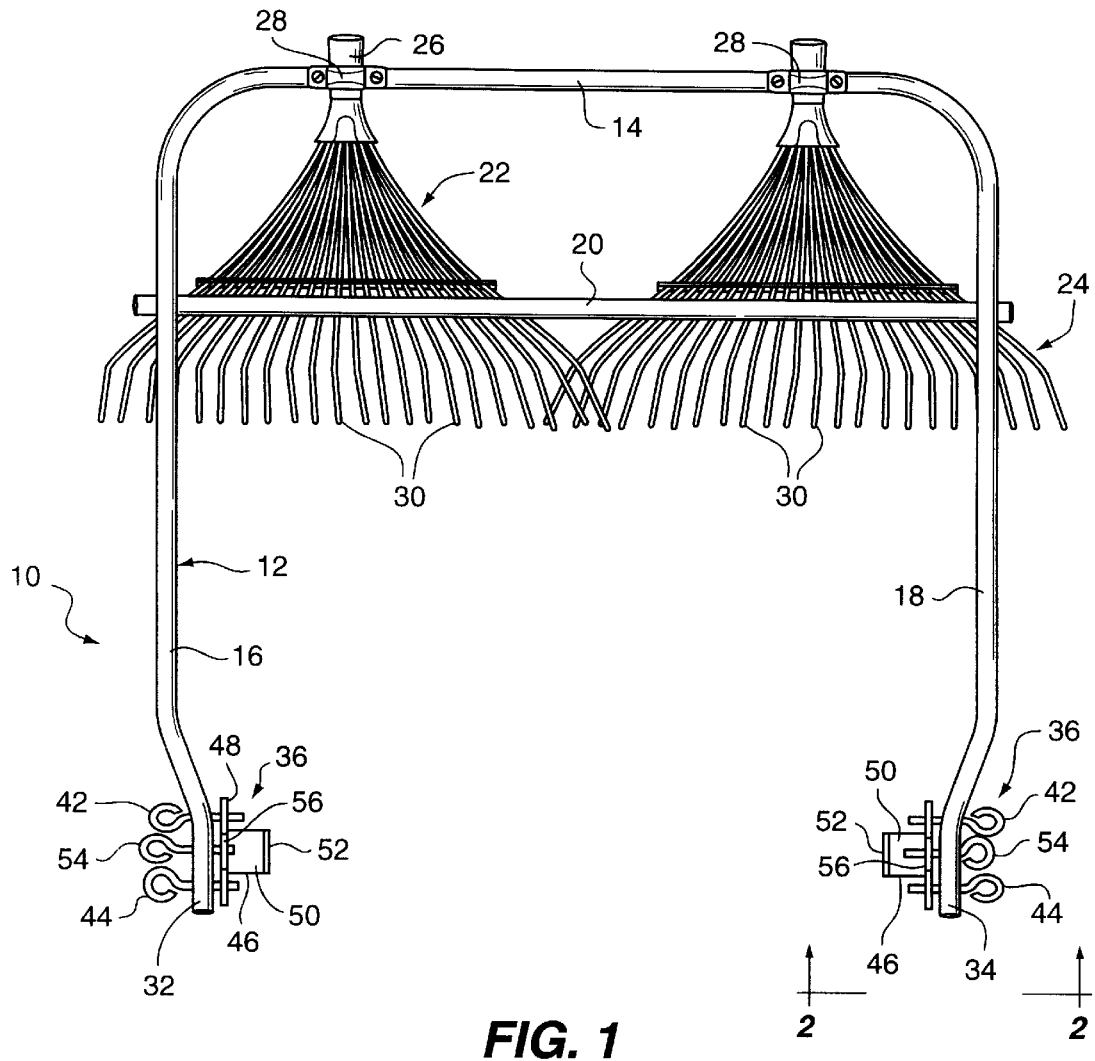
FIG. 1 is a top plan view of the rake attachment of the present invention.

Referring now to the drawings in greater detail, there is illustrated in FIG. 1 a rake attachment 10 constructed according to the teachings of the present invention. As shown, the rake attachment 10 includes a generally U-shaped tubular frame member 12 having a bight portion 14 and opposed leg portions 16 and 18. On the underside of the U-shaped tubing 12 is situated a cross bar or tubing 20 that is spaced a predetermined distance from and generally parallel to the bight portion 14.

Mounted to the bight portion 14 and extending under the cross bar or tubing 20 are two conventional grass or leaf rake heads 22 and 24. A tubular or cylindrical base portion 26 of each rake head 22, 24 is fixed by a clamp 28, much like an electrical conduit clamp, to the upper side of the bight portion 14. Then, fanned out tines 30 of each rake head 22, 24 extend rearwardly and then downwardly under the cross bar or tubing 20.

Each leg portion 16 and 18 has an offset distal end 32 and 34, as shown in FIG. 1.

Figure 2:
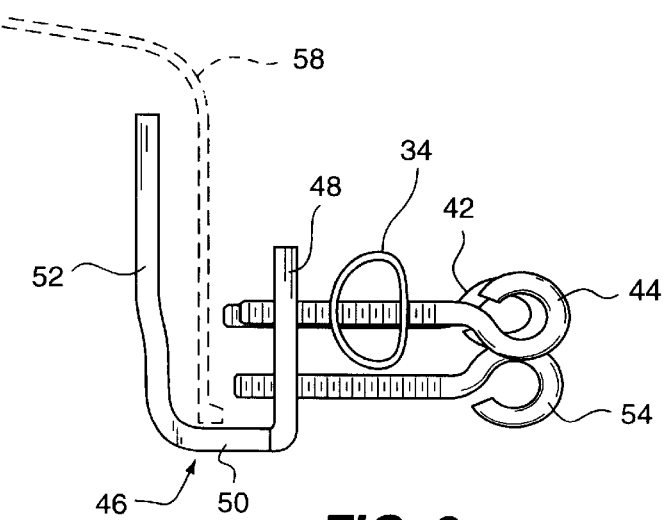
FIG. 2 is an end elevational view of one end of a U-shaped framework of the rake attachment of the present invention and is taken along line 2—2 of FIG. 1.

As best shown in FIG. 2, a clamping structure 36 is mounted to each distal end 32 and 34 by means of wing screws or eyelet headed screws 42 and 44. As shown, each clamping structure 36 include the two screws 42 and 44 which extend laterally through one of the distal ends 32 or 34 to a generally U-shaped bracket 46 having an outer elongate plate 48, a shorter bight portion 50 and an inner plate portion 52 which extends upwardly from the bight portion 50 a distance above the outer plate portion 48. A third wing or eyelet headed screw 54 is threadably received in a middle portion 56 of the outer plate 48 and is adapted to bear against the outer side of a power lawnmower housing 58 shown in phantom in FIG. 2.

Figure 3:
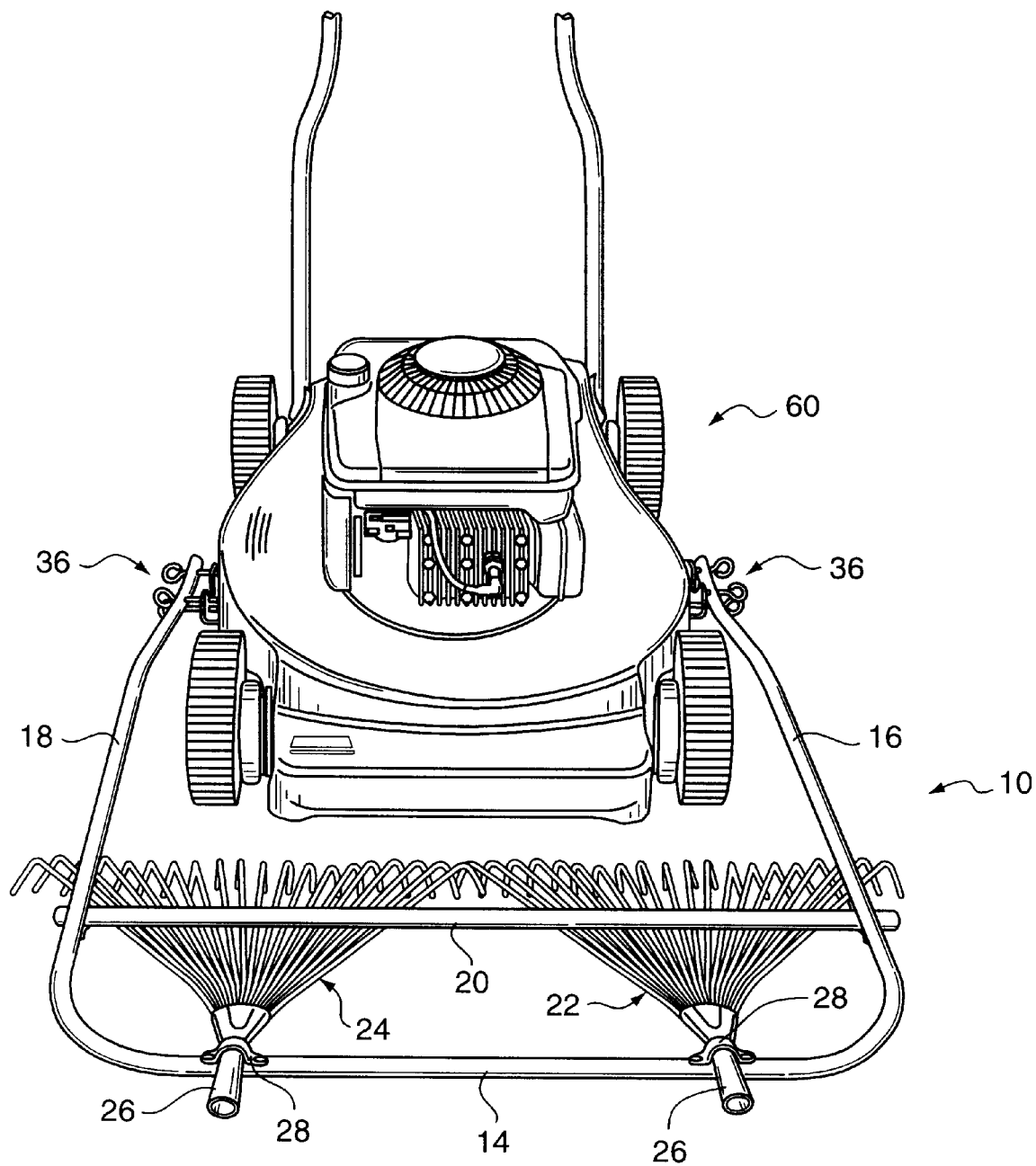
FIG. 3 is an upper front perspective view of the rake attachment attached to the shroud, housing or cowling of a power lawnmower.

The first and second screws 42 and 44 are threadably received through the outer plate 48 and all three screws 38, 40 and 54 are threaded through the outer plate 48 to bear against the housing 58 and thereby clamp the rake attachment 10 to the housing 58 of a power lawnmower 60 shown in FIG. 3.

It will be appreciated that the rake attachment 10 of the present invention provides a simple structure for positioning two rake heads 22, 24 in front of a lawnmower with the cross bar or tubing 20 pushing the tines 30 of each rake head 22, 24 against the ground for raking grass, leaves, sticks or debris from the area in front of the lawnmower 60. This prevents damage to the cutting blade (not shown) of the lawnmower 60 as the rake attachment 10 collects debris in front of the lawnmower 60 and rakes it to a position wherein it can be disposed of as mulch or placed in a garbage bag.

It will also be appreciated that the clamping structure 36 mounted to each distal end 32 and 34 of the rake attachment 10 provides a simple non-invasive structure for clamping the rake attachment 10 to the housing 58 of the lawnmower 60 without the need for any modification to the housing 58. In other words, no screw holes need to be made in the housing 58 and no brackets need to be attached to the housing 58 with screws through the housing 58.

As a result, the rake attachment 10 can easily be attached to any conventional power lawnmower 60 without any special tools and without any modification to the lawnmower 60. Use of a lawn mower with the rake attachment 10 attached thereto over an extensive test period has shown that very few twigs or stones come into contact with the cutting blade of the lawnmower 60, a significant safety feature of the rake attachment 10, and debris is easily collected in front of the lawnmower for later removal at a turnaround spot for the lawnmower 60.

Also, the simple mounting of the rake attachment 10 to the housing 58 of a power lawnmower 60 allows the lawnmower 60 easily to be used with or without the rake attachment 10.

From the foregoing description, it will be apparent that the rake attachment 10 of the present invention has a number of advantages, some of which have been described above and others of which are inherent in the invention. Also it will be understood that modifications can be made to the rake attachment 10 described above without departing from the teachings of the present invention. Accordingly, the scope of the invention is only to be limited as necessitated by the accompanying claims.

I claim:

1. In combination, a non-riding, power lawnmower having a housing mounted on four wheels and having a U-shaped handle connected to and extending upwardly from opposite side walls of said housing and a front mounted rake attachment for attachment to said opposite side walls of said housing and positioned in front of said housing of said power lawnmower for sweeping and scraping the area in the forward path of movement of said power lawnmower and for thatching or aerating the ground in the forward path of movement of said power lawnmower, said rake attachment comprising a generally U-shaped frame member having a bight portion and two leg portions each having a free distal end that extends rearwardly for attachment to one of said opposite side walls of said housing and first and second clamps mounted at each free distal end of each leg portion and each clamp including a U-shaped bracket which is wide enough to extend about one of said opposite side walls and which comprises a bottom plate forming a bight portion of said bracket, an elongate outer plate forming one leg of said bracket and a shorter inner plate forming the other leg of said bracket, having the same width as said bottom plate and extending upwardly a greater distance than said inner plate and adapted to be received within said housing of said power lawnmower and releasably fixed thereto with two, hand manipulatable screws each having a wide, finger engagable head extending through said free distal end of one of said leg portions and through said outer one of said plates for releasably clamping said U-shaped frame member to each one of said opposite side walls of said housing and a third screw which extends through said outer plate below said distal end of said leg portion for engaging an outer surface of said wall of said housing of said lawnmower, said rake attachment further comprising two rake heads, having tines, secured to said bight portion with said tines being located between said leg portions of said U-shaped frame member and said bight portion of said U-shaped frame member and said front wall of said housing, each rake head comprising a cylindrical base portion and a plurality of said tines which extend from said base portion in a fanned out configuration and then extend downwardly for engaging the ground, urging means including a cross-bar which extends across and beneath and is attached to said leg portions of said frame member and above said tines of each rake head for urging said rake heads downwardly.

* * * * *